United States Patent [19]

Ishikawa

[11] Patent Number: 5,546,370

[45] Date of Patent: Aug. 13, 1996

[54] COMPACT APPARATUS HAVING BIDIRECTIONAL MOTION FOR LOADING/UNLOADING AN INFORMATION RECORDING MEDIUM

[75] Inventor: Kazumasa Ishikawa, Tokyo, Japan

[73] Assignee: Olympus Optical Co., Ltd., Japan

[21] Appl. No.: 282,885

[22] Filed: Jul. 29, 1994

[30] Foreign Application Priority Data

Jul. 30, 1993 [JP] Japan .................................. 5-189816

[51] Int. Cl.⁶ ......................... G11B 33/02; G11B 5/008; G11B 15/675
[52] U.S. Cl. ........................................ 369/77.2; 360/96.5
[58] Field of Search ............................. 369/75.1, 75.2, 369/77.1, 77.2; 360/96.5

[56] References Cited

U.S. PATENT DOCUMENTS

| 4,723,185 | 2/1988 | Maeda | 369/77.2 |
| 5,034,834 | 7/1991 | Tsujimoto | 360/96.5 |

FOREIGN PATENT DOCUMENTS

3-8028  2/1991  Japan .

*Primary Examiner*—Stuart S. Levy
*Assistant Examiner*—George J. Letscher
*Attorney, Agent, or Firm*—Laff, Whitesel, Conte & Saret, Ltd.

[57] ABSTRACT

An information recording medium loading/unloading apparatus includes a holder for detachably holding a casing containing the medium. Two pairs of first pins project out from both side surfaces of the holder, each pair being spaced apart from each other in the mounting/removed locus of the casing to the holder. A rocking member is rotatably connected to each first pin, and a second pin projects out from the rocking member at a position spaced apart from the first pin. Two guide members are arranged on both outer sides of the holder and each guide member includes first and second guide slots into which one first pin and one second pin associated thereto on one rocking member. Each guide slot has an inverted L shape with its intersection between a horizontal and vertical extending portions thereof being constituted by a circular curve. The first and second pins in each of the first and second slot are so arranged that the first pin is closer to the vertical portion than the second pin. A driving unit is arranged at least one of the side surfaces of the holder and moves the second center pins provided on the side of the one side surface of the holder, along the horizontal portions of the first and second guide slots.

8 Claims, 4 Drawing Sheets

COMPACT APPARATUS HAVING BIDIRECTIONAL MOTION FOR LOADING/UNLOADING AN INFORMATION RECORDING MEDIUM

BACKGROUND OF THE INVENTION

1. Field of the Invention

The present invention relates to an information recording medium loading/unloading apparatus for loading an information recording medium contained in a casing to, and unloading the same from, a predetermined loading position in an information recording and/or reproducing apparatus for recording and/or reproducing information on the information recording medium, the information recording medium loading/unloading apparatus being provided in the information recording and/or reproducing apparatus.

2. Description of the Related Art

This type of information recording medium loading/unloading apparatus is disclosed, for example, in Japanese Patent Application KOKOKU Publication No. 3-8028. This apparatus will now be described with reference to FIG. 1.

Figure 1:
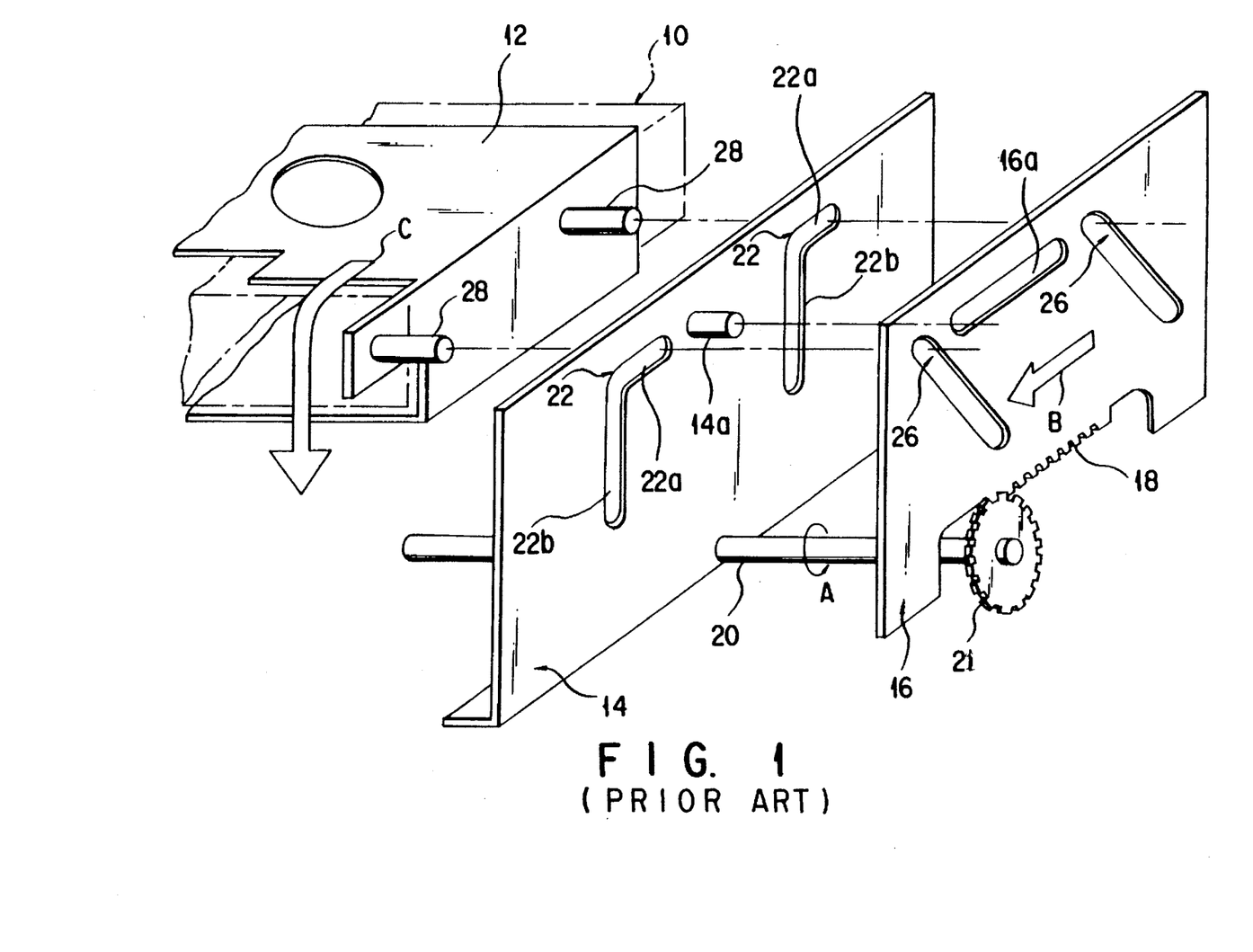
FIG. 1 is an exploded perspective view showing schematically a main part of a conventional information recording medium loading/unloading apparatus.

In this apparatus, a pair of identical mechanisms are provided on both sides of a holder 12 for detachably holding a casing 10 containing an information recording medium such as a video tape. Therefore, in the following description, only one of the mechanisms will be described.

In the vicinity of one side surface of the holder 12, a guide plate 14 and a moving plate 16 are arranged to face each other. The guide plate 14 is fixed to a stationary base plate (not shown) of an information recording and/or reproducing apparatus using a conventional information recording medium loading/unloading apparatus. The moving plate 16 has a horizontal slot 16a in which an engaging projection 14a provided on an outer surface of the guide plate 14 is slidably inserted. Specifically, the moving plate 16 is supported on the guide plate 14 so as to be movable relative to the guide plate 14.

A horizontally extending rack 18 is formed at a lower edge of the moving plate 16. A gear 22 is meshed with the rack 18, and the gear 22 is fixed to a rotational shaft 20 coupled to a rotary drive means (not shown).

The guide plate 14 has a pair of inverted-L shaped movement guide slots 22 which are horizontally spaced apart from each other at a predetermined distance. Each of the movement guide slots 22 has a horizontal guide portion 22a extending horizontally and a vertical guide portion 22b extending substantially vertically from an end of the horizontal guide portion 22a.

The moving plate 16 has a pair of oblique slots 26 at positions corresponding to the pair of movement guide slots 22 of the guide plate 14. The oblique slots 26 extend in a direction crossing directions in which the pair of movement guide slots 22 extend. Each of the oblique slots 26 extends obliquely upward in a direction (i.e. a rearward direction) in which the casing 10 is inserted into the holder 12.

A pair of guide pins 28 are fixed on that side surface of the holder 12, which faces the guide plate 14, at positions horizontally spaced apart from each other at a predetermined distance. The guide pins 28 are inserted in the paired movement guide slots 22 of the guide plate 14 and the paired oblique slots 26 of the moving plate 16.

The operation of the conventional information recording medium loading/unloading apparatus having the above structure will now be described.

when the casing 10 is mounted in and removed from the holder 12, the moving plate 16 is positioned near an end of a horizontal movement range thereof in a direction in which the casing 10 is removed from the holder 12 (i.e. a forward direction). Thus, the guide pins 28 provided on both sides of the holder 12 are held at front ends of the horizontal guide portions 22a of the movement guide slots 22 of the guide plate 14 by upper ends of the oblique slots 26 of the moving plate 16.

When the casing 10 is mounted in the holder 12, the rotational shaft 20 is rotated in a direction of an arrow A by the rotary drive means (not shown). Thereby, the gear 22 moves the moving plate 16 rearwards in a direction of an arrow B in cooperation with the rack 18.

The guide pins 28 positioned at the front ends of the horizontal guide portions 22a of the movement guide slots 22 of the guide plate 14 are pushed rearwards by the upper ends of the oblique slots 26 of the movement plate 16 and are moved towards rear ends of the horizontal guide portions 22a while the movement direction of the guide pins 28 is set by the horizontal guide portions 22a of the movement guide slots 22. At the rear ends of the horizontal guide portions 22a, the guide pins 28 are pushed into the vertical guide portions 22b by the upper ends of the oblique slots 26 of the moving plate 16. While the guide pins 28 are being supported by lower edges of the oblique slots 26 of the moving plate 16, the guide pins 28 are moved towards lower ends of the vertical guide portions 22b. Accordingly, the holder 12 is moved along a locus substantially corresponding to the shapes of the inverted-L shaped movement guide slots 22, as indicated by an arrow C. The casing 10 held by the holder 12 is loaded at a predetermined loading position in the conventional information recording and/or reproducing apparatus for the operation of the information recording medium contained in the casing 10.

In the conventional information recording medium loading/unloading apparatus having the above structure, the moving plate 16 with the pair of oblique slots 26 must have a relatively large area and accordingly needs to have a sufficient strength. Inevitably, outside dimensions of the moving plate 16 increase, and the conventional information recording and/or reproducing apparatus using the conventional information recording medium loading/unloading apparatus is required to have a relatively large space for the movement of the moving plate 16.

This is a problem in reducing size of the conventional information recording and/or reproducing apparatus.

SUMMARY OF THE INVENTION

The present invention has been made under the above circumstances and the object thereof is to provide an information recording medium loading/unloading apparatus having a structure contributing to miniaturization of an information recording and/or reproducing apparatus.

In order to achieve the object, the information recording medium loading/unloading apparatus comprising:

a holder for detachably holding a casing containing an information recording medium;

a pair of first rotational center members projecting outwards from each of both opposed side surfaces of the holder at two locations spaced apart from each other along a movement locus of the casing when the casing is mounted in and removed from the holder;

a pair of rocking members associated with the pair of first rotational center members provided on each of both side surfaces of the holder, the associated first rotational center members being passed through the rocking members, the rocking members being rotatably coupled to the associated first rotational center members;

a second rotational center member projecting from each of the rocking members in the same direction as that in which the associated first rotational center member projects, at a position spaced apart from the first rotational center member;

two guide members provided to face both side surfaces of the holder, and each guide member including first linear guide means and second linear guide means, the first linear guide means linearly guiding one of the pair of first rotational center members provided on the associated side surface of the holder and the second rotational center member provided on one of the paired rocking members associated with the one of the pair of first rotational center members being associated with the first linear guide means, and the second linear guide means linearly guiding the other of the pair of first rotational center members provided on the associated side surface of the holder and the second rotational center member provided on the other of the paired rocking members associated with the other of the pair of first rotational center members being associated with the second linear guide means, each of the first and second linear guide means having a first guide portion extending along the movement locus of the casing when the casing is mounted in and removed from the holder and a second guide portion extending from an end of the first guide portion in a direction crossing the first guide portion, an intersection region between the first guide portion and the second guide portion changes a direction of its extension gradually from the extending direction of the first guide portion to the extending direction of the second guide portion, and the first rotational center member and the second rotational center member both to be lineary guided by each of the first and second linear guide means are arranged such that the first rotational center member is located closer to the second guide portion than the second rotational center member in the first guide portion of the associated one of the first and second linear guide means; and driving means, arranged at least one of the side surfaces of the holder, for moving the second rotational center members provided on the side of the one of the side surfaces of the holder, along the first guide portions of the first and second linear guide means.

According to the information recording medium loading/unloading apparatus having the above structure, when the casing is mounted in and removed from the holder, the holder is situated at a predetermined mounting/removed position where each second rotational center member is located at a free end of the first guide portion of the associated first or second linear guide means.

When the casing is mounted in the holder, the driving means moves the second rotational center member along the first guide portion of the associated first or second linear guide means of the associated guide member towards the second guide portion. Prior to the second rotational center member, the first rotational center member is first brought into the second guide portion of the associated first or second linear guide means.

Like the first rotational center member, a direction of movement of the holder is changed from the extending direction of the first guide portion to the extending direction of the second guide portion. Thereafter, the movement of the second rotational center member by the driving means is stopped, and the movement of the holder in the extending direction of the second guide portion is also stopped. Thereby, the information recording medium contained in the casing in the holder is loaded at a predetermined position in the information recording and/or reproducing apparatus using the information recording medium loading/unloading apparatus according to the present invention.

When the information recording medium contained in the casing in the holder is unloaded from the predetermined position in the information recording and/or reproducing apparatus, the driving means moves the associated second rotational center member from the second guide portion towards the farther end of the first guide portion in the associated first or second linear guide means of the associated guide member. Thereby, the first rotational center member follows the associated second rotational center member via the rocking member and returns to the first guide portion from the second guide portion of the associated first or second linear guide means.

The driving means stops moving the second rotational center member when the second rotational center member reaches the free end portion of the first guide portion of the associated first or second linear guide means. Thereby, the holder is also stopped at the aforementioned predetermined position.

As compared to the above-described conventional information recording medium loading/unloading apparatus, the information recording medium loading/unloading apparatus of the present invention, which has the above structure and operates as described above, does not include a member requiring large outside dimensions. Therefore, a space required for the operation can be reduced, contributing to the miniaturization of the information recording and/or reproducing apparatus using the information recording medium loading/unloading apparatus according to the present invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the information recording medium loading/unloading apparatus according to the present invention will now be described in detail with reference to FIGS. 2 to 5.

Figure 2:
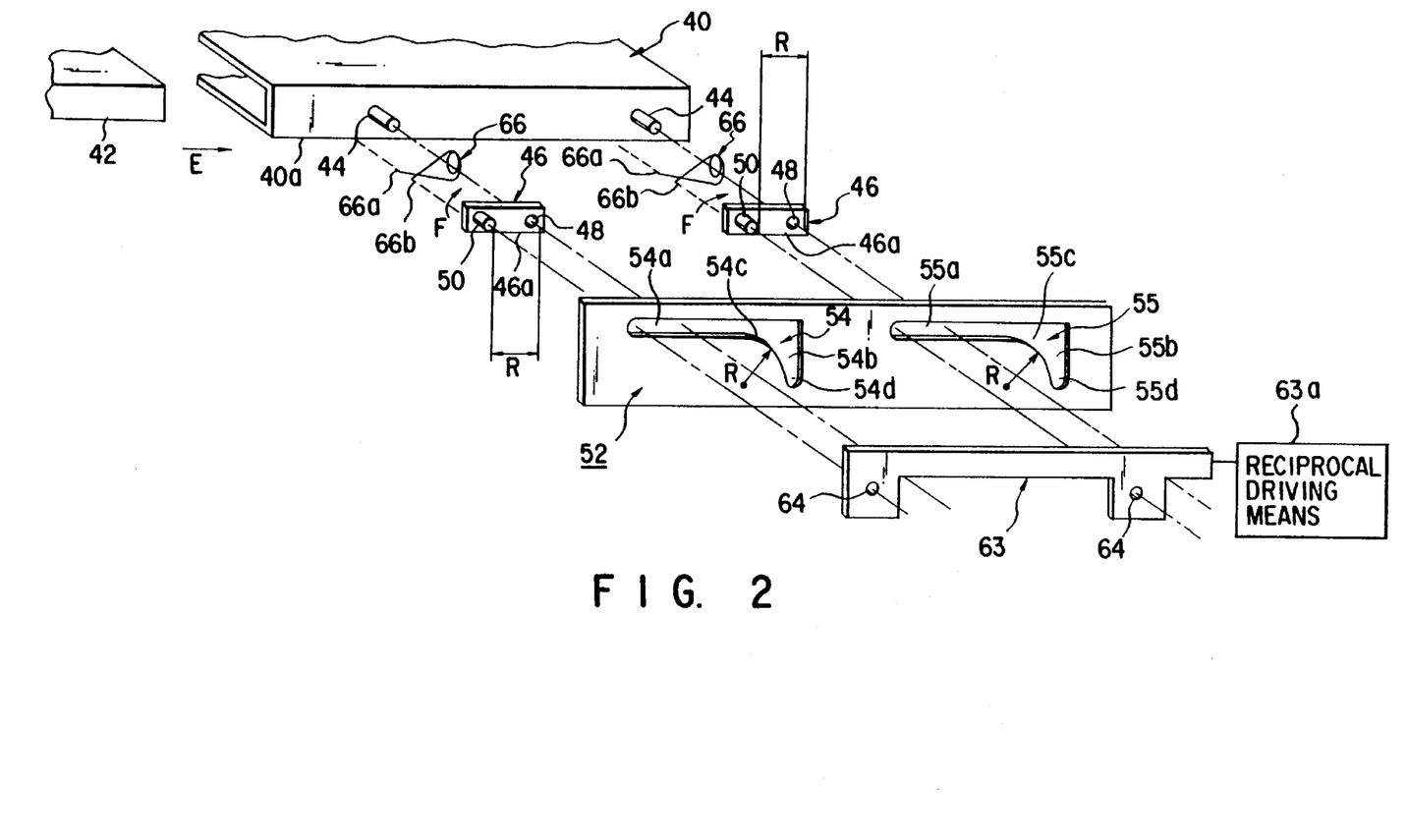
FIG. 2 is an exploded perspective view showing schematically a main part of an information recording medium loading/unloading apparatus according to an embodiment of the present invention.

In FIG. 2, reference numeral 40 denotes a cartridge holder having a substantially box-like shape (hereinafter referred to as "holder"). A cartridge 42 containing an information recording medium (not shown) such as a magnetic optical disk is inserted into the holder 40 in a direction of arrow E, and the holder 40 holds the cartridge 42 detachably.

Two first columnar rotational center members (or pins) 44 are fixed on, and project from, each of both right and left opposed side surfaces of the holder 40 so that they are spaced apart from each other at a predetermined distance along a movement locus of the cartridge 42 when the cartridge 42 is mounted in and removed from the holder 40 (i.e. a back-and-forth directions in this embodiment). Since the structure of the information recording medium loading/unloading apparatus according to this embodiment is the same on the right and left sides of the holder 40, FIGS. 2 to 5 show only a right-side part of the structure and do not show the left-side part of the structure.

Each of the first rotational center members 44 is rotatably passed through a hole 48 formed in one end portion of an elongated rocking member 46. A second columnar rotational center member (or pin) 50 is fixed on the other end portion of the rocking member 46 so as to project in the same direction as the first rotational center member 44. The second rotational center member 50 is positioned spaced apart from the hole 48 at a predetermined distance.

A pair of guide plates 52 are arranged near both right and left side surfaces of the holder 40 such that the guide plates 52 face the right and left side surfaces of the holder 40 and being substantially in parallel thereto. The paired guide plates 52 are fixed to a stationary base plate (not shown) of an information recording and/or reproducing apparatus (not shown) using the information recording medium loading/unloading apparatus of the present embodiment. Each guide plate 52 has first and second guide slots 54 and 55 of the same dimensions and size, in each of which the associated first and second rotational center members 44 and 50 are inserted.

More specifically, the first and second guide slots 54 and 55 are formed in the associated guide plate 52 at a predetermined distance in the back-and-forth directions, and each of the first and second guide slots 54 and 50 has an inverted-L shape. The front-side first and second pins 44 and 50 are inserted in the first guide slot 54, and the rear-side first and second pins 44 and 50 are inserted in the second guide slot 55.

Each of the first and second guide slots 54 and 55 includes a horizontally extending portion ("horizontal portion") 54a or 55a, and a vertically extending portion ("vertical portion") 54b or 55b extending substantially vertically downwards from a rear end of the horizontal portion 54a, 55a. An intersection portion between a lower edge of the horizontal portion 54a or 55a of each of the first and second guide slots 54 and 55 and a front edge of the vertical portion 54b or 55b is formed as a curved edge 54c, 55c which gradually changes its extending direction from the lower edge to the front edge.

The curved edge 54c or 55c has a quarter-circular shape with a predetermined radius R. The value of the radius R of the curved edge 54c, 55c is equal to a distance L between a center of the first rotational center member 44 on the rocking member 46 and that portion (i.e. inner side portion) of an outer peripheral surface of the second rotational center member 50, which is closer to the first rotational center member 44. A lower end portion of the curved edge 54c or 55c terminates at a substantially vertical front edge of the vertical portion 54b or 55b of the associated one of the first and second guide slots 54 and 55. The substantially vertical front edge of the vertical portion 54b or 55b is left at a lower end portion 54d or 55d of the vertical portion 54b or 55b.

The second rotational center members 50 project outward from the associated first and second guide slots 54 and 55 of the guide plate 52. The outward projecting end portions of the two second rotational center members 50 are rotatably engaged in a pair of holes 64 formed in a reciprocal driving plate 63. The reciprocal driving plate 63 extends along the movement locus (in the back-and-forth directions) of the cartridge 42 when the cartridge 42 is mounted in and removed from the holder 40 so that the driving plate 63 is in parallel to an outer side surface of the guide plate 52, the outer side surface being located opposite to the holder 40.

The reciprocal driving plate 63 is supported by the aforementioned stationary base plate (not shown) of the information recording and/or reproducing apparatus (not shown) so as to be movable in a predetermined horizontal range in the back-and-forth directions. The reciprocal driving plate 63 is moved horizontally by reciprocal driving means 63a.

For example, the reciprocal driving means 63a may be constituted by providing the reciprocal driving plate 63 with a rack extending in the back-and-forth directions and driving the rack by a rotationally driving gear. Alternatively, the reciprocal driving means may be constituted by a combination of a plunger/solenoid assembly and a tension coil spring which are fixed at one end to the reciprocal driving plate 63 and fixed at the other end to the stationary base plate (not shown) of the information recording and/or reproducing apparatus (not shown). Moreover, the reciprocal driving means may be constituted by a conventional structure such as a rotation movement-reciprocal movement conversion mechanism constituted by a combination of a rotary member and a lever one end of which is attached rotatably to a side surface of the rotary member at an eccentric position thereon and the other end of which is attached rotatably to the reciprocal driving plate 63.

The reciprocal driving plate 63 and reciprocal driving means 63a may be provided on at least one side of the holder 40. However, the driving plate 63 and driving means 63a may be provided on each of both sides of the holder 40 so that two pairs of the driving plates 63 and driving means 63a may be driven synchronously to move the holder 40 more smoothly. If two reciprocal driving plates 63 are provided on both sides of the holder and one reciprocal driving means 63a is used commonly to drive the two driving plates 63, smooth movement of the holder 40 is ensured while the installation space and cost for one reciprocal driving means 63a will be saved.

In the present embodiment, a torsion coil spring 66 is wound around on each first rotational center member 44 between the associated rocking member 46 and the associated one side surface of the holder 40. One end portion 66a of the torsion coil spring 66 is engaged with a bottom surface of the holder 40 and the other end portion 66b is engaged with a lower edge portion 46a of the rocking member 46. Thereby, the rocking member 46 is urged in a direction of arrow F about the first rotational center member 44. As a result, the second rotational center member 50 is put in contact with an upper edge of the horizontal portion 54a or 55a of the associated first or second guide slot 54, 55, while the first rotational center member 44 is put in contact with the lower edge of the horizontal portion 54a or 55a.

An The operation of the information recording medium loading/unloading apparatus according to the present embodiment having the structure as described above in detail will now be described. The loading operation for loading the information recording medium (not shown) at a predetermined information recording medium loading position in the information recording and/or reproducing apparatus (not shown) using the information recording medium loading/unloading apparatus of the present embodiment is reverse to an unloading operation for unloading the information recording medium from the predetermined information recording medium loading position. Thus, only the loading operation will now be described.

Figure 3:
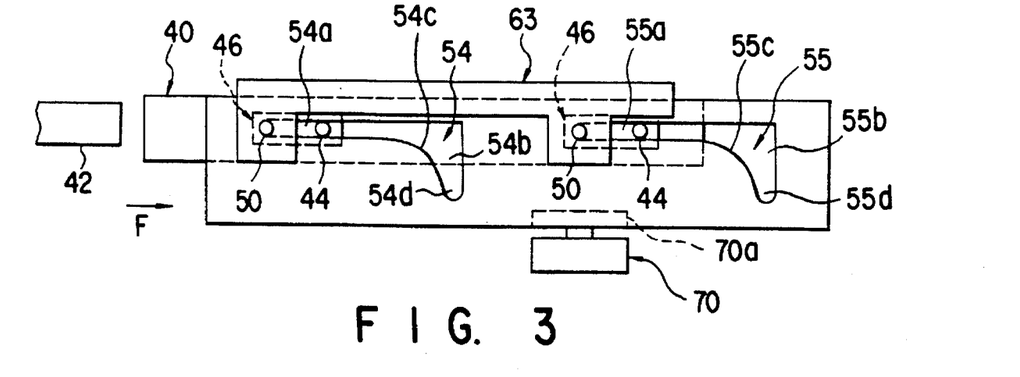
FIG. 3 is a schematic side view showing the information recording medium loading/unloading apparatus shown in FIG. 2, wherein a holder for detachably holding a casing of a magnetic recording medium is positioned at a casing mounting/removed position in an information recording and/or reproducing apparatus using the information recording medium loading/unloading apparatus.

When the cartridge 42 is mounted in and removed from the holder 40, the first and second rotational center members 44 and 50 are positioned in the horizontal portions 54a, 55a of the first and second guide slots 54 and 55 of the guide member 52 provided on each of both right and left sides of the holder 40. The second rotational center member 50 is situated at the front end (i.e. free end) of the horizontal portion 54a or 55a of the associated first or second guide slot 54, 55. The first rotational center member 44 coupled to the second rotational center member 50 by means of the rocking member 46 is positioned closer to the associated vertical portion 54b or 55b than the second rotational center member 50.

As described above, the first rotational center member 44 is put in contact with the lower edge of the horizontal portion 54a or 55a of the associated first or second guide slot 54 or 55 by the urging force of the torsion coil spring 66 (see FIG. 2) wound around the first rotational center member 44 between the rocking member 46 and the associated side surface of the holder 40. Similarly, the second rotational center member 50 is put in contact with the upper edge of the horizontal portion 54a or 55a of the associated first or second guide slot 54 or 55.

At this time, the holder 40 is positioned in the mounting/removed position, which is positioned obliquely upwards in front of a turntable 70a of a spindle motor 70 mounted at a predetermined position on the stationary base plate (not shown) in the information recording and/or reproducing apparatus (not shown).

When the cartridge 42 is held in a predetermined position of the holder 40, the driving plate 63 is moved rearwards (i.e. to the right in FIG. 3) by the reciprocal driving means 63a (see FIG. 2) and accordingly the paired second rotational center members 50 engaged in the horizontal portions 54a and 55a of the first and second guide slots 54 and 55 move towards the rear ends of the horizontal portions 54a and 55a. The paired second rotational center members 50 are coupled to the first rotational center members 44 by means of the rocking members 46 and the first rotational center members 44 are attached to the holder 40. Thus, the first rotational center members 44 and the holder 40 move rearwards horizontally.

Figure 4:
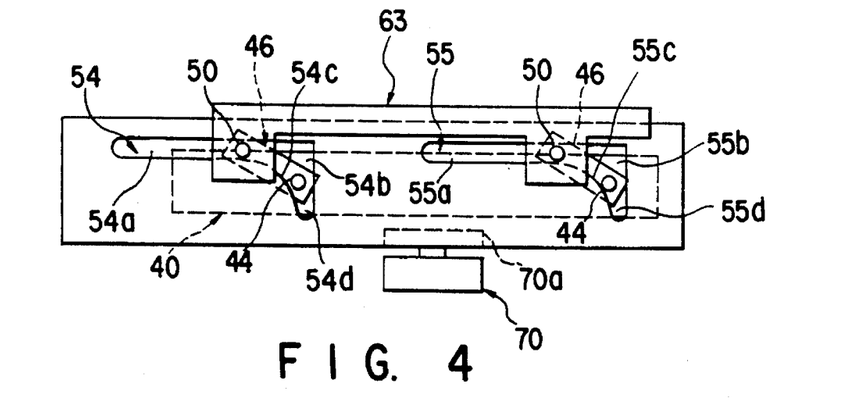
FIG. 4 is a schematic side view showing the information recording medium loading/unloading apparatus shown in FIG. 2, wherein the holder is being moved from the mounting/removed position shown in FIG. 3 to a predetermined loading position in the information recording and/or reproducing apparatus.

When the first rotational center members 44 sliding on the lower edges of the horizontal portions 54a and 55a of the first and second guide slots 54 and 55 are reached at the curved edges 54c and 55c of the intersections between the lower edges of the horizontal portions 54a and 55a and the front edges of the associated vertical portions 54b and 55b, the first rotational center members 44 begin to move rearwards and downwards along the curved edges 54c and 55c.

During this time, the second rotational center members 50 move horizontally along the upper edges of the associated horizontal portions 54a and 55b.

In other words, the holder 40, on which the first rotational center members 44 are attached, moves rearwards in an obliquely downward direction while maintaining the horizontal attitude.

Figure 5:
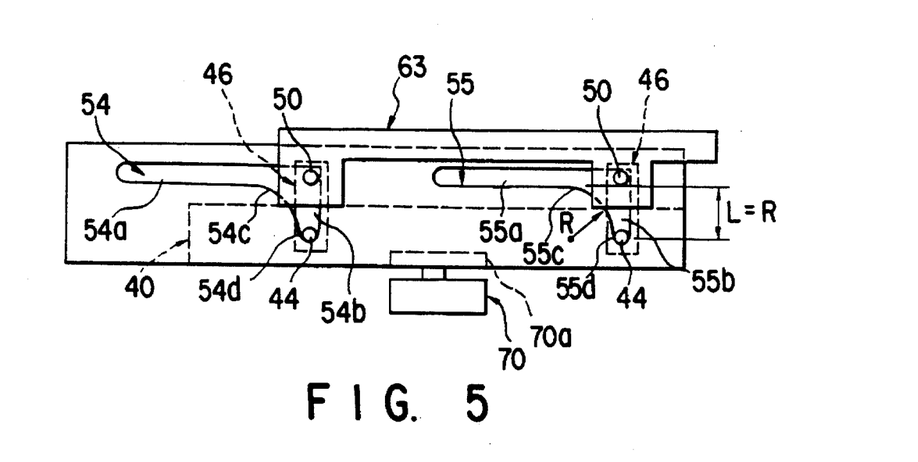
FIG. 5 is a schematic side view showing the information recording medium loading/unloading apparatus shown in FIG. 2, wherein the holder is reached at a predetermined loading position in the information recording and/or reproducing apparatus.

When the first rotational center members 44 enter the lower ends 54d, 55d of the vertical portion 54b, 55b from the lower ends of the curved edges 54c, 55c of the associated first and second guide slot 54, 55, the first rotational center members 44 (i.e. holder 40) moves vertically over a little distance since the front edges of the lower end portions 54d, 55d extend vertically.

As is shown in FIG. 5, when the first rotational center members 44 are reached the lower ends 54d, 55d of the vertical portions 54b, 55b of the associated first and second guide slots 54, 55, the backward movement of the paired second rotational center members 50 by means of the driving plate 63 is stopped.

At this time, a predetermined position of the recording medium (not shown) in the casing 42 (see FIG. 3) held in the holder 40 is loaded on the turntable 70a of the spindle motor 70. A position of the holder 40 at this time is a loading position.

As has been described above in detail, according to this embodiment, outside dimensions of the driving plate 63 moving in the information recording and/or reproducing apparatus (not shown) using the loading/unloading apparatus of the present embodiment is relatively small. Thus, a relatively small operational space for the driving plate 63 is required in the information recording and/or reproducing apparatus (not shown). Accordingly, the size of the information recording and/or reproducing apparatus can be decreased further.

Moreover, according to this embodiment, since the movement of two pairs of first and second rotational center members 44 and 50 is guided by the first and second guide slots 54 and 55 of the guide plate 52 on each of side surfaces of the holder 40, the durability of the first and second rotational center members is enhanced and the movement thereof is smoothed.

In the present embodiment, a distance of a vertical movement of the holder 40 is determined by a distance between the first rotational center member 44 and second rotational center member 50 on the common rocking member 46. Various advantages and disadvantages will occur, depending on whether the distance between the first and second rotational center members 44 and 50 is greater or less than the radius R of the curved edge 54c, 55c of each of the first and second guide slots 54 and 55.

Figure 6:
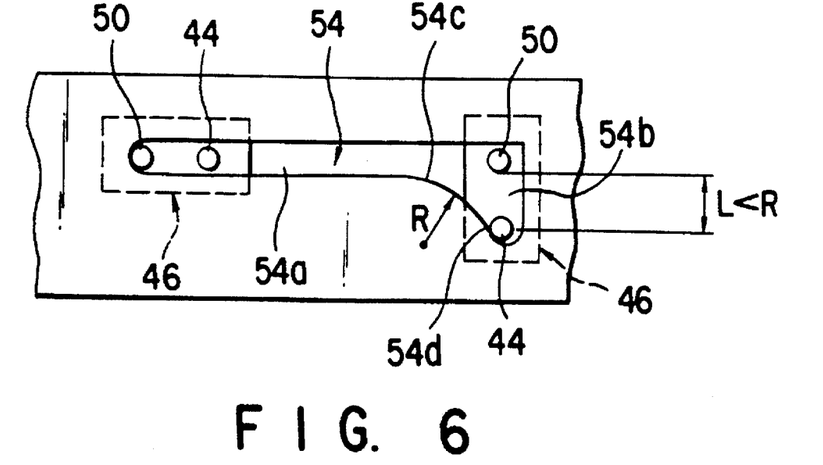
FIG. 6 is a schematic side view showing a main part of a first modification of the information recording medium loading/unloading apparatus according to the embodiment of the present invention.

For example, in a first modification as shown in FIG. 6, a distance L between the center of the first rotational center member 44 and the inner side portion of the outer peripheral surface of the associated second rotational center member 50, the inner side portion being positioned closer to the first rotational center member 44, is less than the radius R of the curved edge 54c. According to this modification, for example, when the rocking member 46 is moved from the loading position, at which the rocking member 46 is positioned in the right-end vertical portion 54b of the associated first guide slot 54, to the mounting/removed position at which the rocking member 46 is positioned at the left free end of the horizontal portion 54a (i.e. "unloading time"), a frictional resistance between the first rotational center member 44 and the vertical portion 54b is low and a driving force needed for moving the rocking member 46 can be reduced.

However, a vertical movement of the second rotational center member 50 coupled to the first rotational center member 44 by means of the rocking member 46 is prohibited by the driving plate 63 (see FIGS. 2 to 5). Thus, a distance of a vertical movement of the first rotational center member 44 is determined by the distance between the first and second rotational center members 44 and 50 on the rocking member 46. Therefore, if the radius R is small and distance L is short, the distance of vertical movement of the first rotational center member 44, i.e. a distance of a vertical movement of the holder 40 (see FIGS. 2 to 5), cannot be increased.

Therefore, when the rocking member 46 is moved from the mounting/removed position to the loading position (i.e. "loading time") in reverse to the unloading time, the information recording medium (not shown) contained in the casing 42 (see FIGS. 2 to 5) held by the holder 40 can not have a sufficient vertical movement distance so that the medium is placed onto the turntable 70a of the spindle motor 70 (FIGS. 3 to 5) from above obliquely. Consequently, it is highly possible that the information recording medium (not shown) is not exactly placed onto the turntable 70a.

Figure 7:
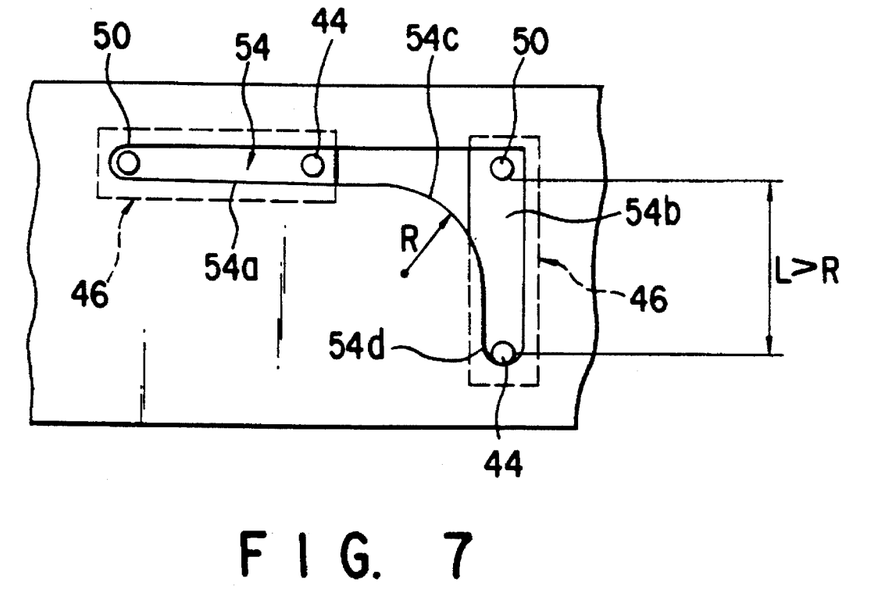
FIG. 7 is a schematic side view showing a main part of a second modification of the information recording medium loading/unloading apparatus according to the embodiment of the present invention.

According to a second modification as shown in FIG. 7, the distance L between the center of the first rotational center member 44 and the inner side portion of the outer peripheral surface of the associated second rotational center member 50 is greater than the radius R of the curved edge 54c. In this case, the distance of vertical movement of the first rotational center member 44 (i.e. holder 40) can be increased, and the information recording medium (not shown) can be exactly placed on the turntable 70a at all times.

However, at the unloading time, the frictional resistance between the first rotational center member 44 and the vertical portion 54b is high and the driving force needed for moving the rocking member 46 increases. Consequently, there is a possibility that the holder 40 cannot be moved from the loading position to the unloading position.

Taking the above conditions into consideration, in the above-described embodiment, the distance L between the center of the first rotational center member 44 and the inner side portion of the outer peripheral surface of the associated second rotational center member 50, the inner side portion being positioned closer to the first rotational center member 44, is set to be substantially equal to the radius R of the curved edge 45c.

The present invention is not limited to the above embodiment, and various embodiments and modifications can be made.

For example, in the above embodiment, the intersection region between the lower edge of the horizontal portion 54a of the first guide slot 54 and the front edge of the vertical portion 54b, and the intersection region between the lower edge of the horizontal portion 55a of the second guide slot 55 and the front edge of the vertical portion 55b are formed as the curved edges 54c and 55c. However, these intersection regions may be formed as oblique edges (indicated by a two-dots-and-dash line in FIG. 7) extending to cross the associated lower and front edge.

The first and second guide slots 54 and 55 of the guide plate 52 are not necessarily through-holes. The guide slots 54 and 55 may be replaced with recesses or grooves formed in the guide plate 52. In this case, the driving plate 63 is positioned between at least one side surface of the holder 40 and the associated guide plate 52 so as not to prevent vertical movement of the first rotational center member 44 or rocking movement of the rocking member 46.

Furthermore, the recording medium is not limited to a magnetic optical disk, but it may be an optical disk, a magnetic disk, a video tape, a cassette tape, etc.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed:

1. An information recording medium loading/unloading apparatus being provided in an information recording and/or reproducing apparatus for recording and/or reproducing information on an information recording medium contained in a casing, for loading the information recording medium to, and unloading the casing from, a predetermined loading position in the information recording and/or reproducing apparatus, said information recording medium loading/unloading apparatus comprising:

a holder for detachably holding the casing containing the information recording medium;

a pair of first rotational center members projecting outwards from each of both opposed side surfaces of the holder at two locations spaced apart from each other along a movement locus of the casing when the casing is mounted in and removed from the holder;

a pair of rocking members associated with the pair of first rotational center members provided on each of both side surfaces of the holder, the associated first rotational center members being passed through the rocking members, the rocking members being rotatably coupled to the associated first rotational center members;

a second rotational center member projecting from each of the rocking members in the same direction as that in which the associated first rotational center member projects, at a position spaced apart from the first rotational center member;

two guide members provided to face both side surfaces of the holder, and each guide member including first linear guide means and second linear guide means, the first linear guide means linearly guiding one of the pair of first rotational center members provided on the associated side surface of the holder and the second rotational center member provided on one of the paired rocking members associated with the one of the pair of first rotational center members being associated with the first linear guide means, and the second linear guide means linearly guiding the other of the pair of first rotational center members provided on the associated side surface of the holder and the second rotational center member provided on the other of the paired rocking members associated with the other of the pair of first rotational center members being associated with the second linear guide means, each of the first and second linear guide means having a first guide portion extending along the movement locus of the casing when the casing is mounted in and removed from the holder and a second guide portion extending from an end of the first guide portion in a direction crossing the first guide portion, an intersection region between the first guide portion and the second guide portion changes a direction of its extension gradually from the extending direction of the first guide portion to the extending direction of the second guide portion, and the first rotational center member and the second rotational center member both to be linearly guided by each of the first and second linear guide means are arranged such that the first rotational center member is located closer to the second guide portion than the second rotational center member in the first guide portion of the associated one of the first and second linear guide means; and driving means, arranged at least one of the side surfaces of the holder, for moving the second rotational center members provided on the side of the one of the side surfaces of the holder, along the first guide portions of the first and second linear guide means.

2. An information recording medium loading/unloading apparatus according to claim 1, wherein the first guide portion of each of the first and second linear guide means extends substantially horizontally, the second guide portion of each of the first and second linear guide means extends substantially vertically, and an intersection region between a lower edge of the first guide portion and a front edge of the second guide portion is constituted by a curved edge changing a direction of its extension gradually from the extending direction of the lower edge of the first guide portion to the extending direction of the front edge of the second guide portion.

3. An information recording medium loading/unloading apparatus according to claim 2, further comprising urging means for urging the first rotational center member onto the lower edge of the associated first guide portion of each of the first and second linear guide means and onto the front edge of the associated second guide portion.

4. An information recording medium loading/unloading apparatus according to claim 3, wherein the urging means includes a torsion coil spring wound around the first rotational center member and having both end portions engaged with the holder and the associated rocking member.

5. An information recording medium loading/unloading apparatus according to claim 1, wherein the first guide portion of each of the first and second linear guide means extends substantially horizontally, the second guide portion of each of the first and second linear guide means extends substantially vertically, and an intersection region between a lower edge of the first guide portion and a front edge of the second guide portion is constituted by an oblique edge extending in a direction crossing an extending direction of the lower edge of the first guide portion to an extending direction of the front edge of the second guide portion.

6. An information recording medium loading/unloading apparatus according to claim 5, further comprising urging means for urging the first rotational center member onto the lower edge of the associated first guide portion of each of the first and second linear guide means and onto the front edge of the associated second guide portion.

7. An information recording medium loading/unloading apparatus according to claim 6, wherein the urging means includes a torsion coil spring wound around the first rotational center member and having both end portions engaged with the holder and the associated rocking member.

8. An information recording medium loading/unloading apparatus in an information recording and/or reproducing apparatus for recording and/or reproducing information on an information recording medium contained in a casing, for loading the information recording medium to, and unloading the casing from, a predetermined loading position in the information recording and/or reproducing apparatus, said information recording medium loading/unloading apparatus comprising:

a holder for detachably holding the casing containing the information recording medium;

a pair of first rotational center members projecting outward from each of both opposed side surfaces of the holder at two locations spaced apart from each other along a movement locus of the casing when the casing is mounted in and removed from the holder;

a pair of rocking members associated with the pair of first rotational center members provided on each of both side surfaces of the holder, the associated first rotational center members being passed through the rocking members, the rocking members being rotatably coupled to the associated first rotational center members;

a second rotational center member projecting from each of the rocking members in the same direction as that in which the associated first rotational center member projects, at a position spaced apart from the first rotational center member;

two guide members provided to face both side surfaces of the holder, and each guide member including first linear guide means and second linear guide means, the first linear guide means linearly guiding one of the pair of first rotational center members provided on the associated side surface of the holder and the second rotational center member provided on one of the paired rocking members associated with the one of the pair of first rotational center members associated with the first linear guide means, and the second linear guide means linearly guiding the other of the pair of first rotational center members provided on the associated side surface of the holder and the second rotational center member provided on the other of the paired rocking members associated with the other of the pair of first rotational center members being associated with the second linear guide means, each of the first and second linear guide means having a first guide portion extending along the movement locus of the casing when the casing is mounted in and removed from the holder and a second guide portion extending from an end of the first guide portion in a direction crossing the first guide portion, an intersection region between the first guide portion and the second guide portion changes a direction of its extension gradually from the extending direction of the first guide portion to the extending direction of the second guide portion, and the first rotational center member and the second rotational center member both to be linearly guided by each of the first and second linear guide means are arranged such that the first rotational center member is located closer to the second guide portion than the second rotational center member in the first guide portion of the associated one of the first and second linear guide means; and driving means associated with at least one of the side surfaces of the holder for moving the second rotational center members provided on the side of the one of the side surfaces of the holder, along the first guide portions of the first and second linear guide means, the first guide portion of each of the first and second linear guide means extending substantially horizontally, the second guide portion of each of the first and second linear guide means extending substantially vertically, and an intersection region between a lower edge of the first guide portion and a front edge of the second guide portion being constituted by a curved edge changing a direction of its extension gradually from the extending direction of the lower edge of the first guide portion to the extending direction of the front edge of the second guide portion, said curved edge having a radius substantially equal to a distance between the associated first rotational center member and the associated second rotational center member.

* * * * *

UNITED STATES PATENT AND TRADEMARK OFFICE
CERTIFICATE OF CORRECTION

PATENT NO. : 5,546,370
DATED : August 13, 1996
INVENTOR(S) : Kazumasa Ishikawa

It is certified that error appears in the above-indentified patent and that said Letters Patent is hereby corrected as shown below:

In column 1, lines 41 and 42, change "22" to —21—.

Signed and Sealed this

Third Day of December, 1996

Attest:

BRUCE LEHMAN

Attesting Officer　　　　Commissioner of Patents and Trademarks